US011874936B2

(12) United States Patent
Laing et al.

(10) Patent No.: US 11,874,936 B2
(45) Date of Patent: Jan. 16, 2024

(54) GROUP PRINTING

(71) Applicant: Hewlett-Packard Development Company, L.P., Spring, TX (US)

(72) Inventors: Thalia May Laing, Bristol (GB); Joshua Serratelli Schiffman, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 397 days.

(21) Appl. No.: 17/056,638

(22) PCT Filed: Oct. 31, 2018

(86) PCT No.: PCT/US2018/058455
§ 371 (c)(1),
(2) Date: Nov. 18, 2020

(87) PCT Pub. No.: WO2020/091763
PCT Pub. Date: May 7, 2020

(65) Prior Publication Data
US 2021/0248246 A1 Aug. 12, 2021

(51) Int. Cl.
*H04L 29/06* (2006.01)
*G06F 21/60* (2013.01)
(Continued)

(52) U.S. Cl.
CPC .......... *G06F 21/608* (2013.01); *G06F 3/1222* (2013.01); *G06F 3/1238* (2013.01); *H04L 9/0833* (2013.01)

(58) Field of Classification Search
None
See application file for complete search history.

(56) References Cited

U.S. PATENT DOCUMENTS 7,003,667 B1 2/2006 Slick et al.
7,506,159 B2 3/2009 Shima et al.
(Continued)

FOREIGN PATENT DOCUMENTS

GB 2378871 2/2003
JP H09134264 A 5/1997
JP 2002351317 A 12/2002

OTHER PUBLICATIONS

Boneh, Dan et al. "Collusion resistant broadcast encryption with short ciphertexts and private keys." Crypto 2005, LNCS 3621, pp. 258-275.
(Continued)

*Primary Examiner* — Maung T Lwin
(74) *Attorney, Agent, or Firm* — Knobbe, Martens, Olson & Bear, LLP (57) ABSTRACT

According to aspect of the present disclosure there are provided methods and apparatus for printing to a group of printers in a network, including a method comprising provisioning each printing device of the plurality of printing devices with a respective private cryptographic key, defining a first group of printing devices comprising a first subset of the plurality of printing devices, generating a first group public key for the defined first group of printing devices, the first group public key generated based on public cryptographic keys corresponding to the respective private cryptographic keys provisioned to the first subset of the plurality of printing devices, and providing the first group public key to a user.

15 Claims, 7 Drawing Sheets

(51) Int. Cl.
*G06F 3/12* (2006.01)
*H04L 9/08* (2006.01)

(56) References Cited

U.S. PATENT DOCUMENTS

| | | | |
|---|---|---|---|
| 8,055,913 B2* | 11/2011 | Ginter | G06F 21/78 713/170 |
| 8,156,337 B2 | 4/2012 | Balfanz et al. | |
| 8,988,713 B2 | 3/2015 | Gutnik et al. | |
| 9,019,535 B1 | 4/2015 | Hansen | |
| 2002/0042884 A1* | 4/2002 | Wu | H04L 63/123 726/10 |
| 2003/0044009 A1 | 3/2003 | Dathathraya | |
| 2004/0109567 A1 | 6/2004 | Yang et al. | |
| 2005/0163549 A1 | 7/2005 | Shima et al. | |
| 2007/0103715 A1* | 5/2007 | Nakata | G06F 3/1273 358/1.14 |
| 2011/0026066 A1* | 2/2011 | Akita | H04N 1/4413 358/1.14 |
| 2018/0144146 A1* | 5/2018 | Juriasingani | G06F 21/608 |

OTHER PUBLICATIONS

Dodis, Yevgeniy et al. "Public key broadcast encryption for stateless receivers." In ACM Workshop on Digital Rights Management, pp. 61-80. Springer, Berlin, Heidelberg, 2002.

Sathyanarayana, S. V. et al. "Group diffie hellman key exchange algorithm based secure group communication." In 2017 3rd International Conference on Applied and Theoretical Computing and Communication Technology, pp. 281-289.

Wu, Qianhong et al. "Bridging broadcast encryption and group key agreement." Asiacrypt 2011, LNCA 7073, pp. 143-160, 2011.

\* cited by examiner

GROUP PRINTING

BACKGROUND

Network printing allows a user to print a document to a remote printer. Group printing allows a document, or print job, to be transmitted to a group of printers and a user may then select any of the printers within the group, such as one of a number of printers in a print room, to release the print job and provide the printed output.

In order to maintain confidentiality of a print job transmitted over a network, the print job may be encrypted prior to transmission.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

A user may want to securely print a print job to a particular group of printing devices which they trust, rather than to one specified, individual printer. The user may print to multiple printers by encrypting the print job using a secret key and then independently encrypting the corresponding decryption key separately for each printer in the group using a respective encryption key for each printer. To implement this scheme, the user first finds and selects which printers will be in the group and then retrieves an encryption key, such as a public key, for each individual printer to encrypt the decryption key for the print job for each chosen printer under its respective public key.

There may be scenarios in which the user does not know which printers are available to them to print to and what their identities are, or scenarios in which the user knows which printers are available to them but doesn't know their exact identities. In such scenarios, it may be difficult for a user to identify the correct printer public keys to use to encrypt the print job decryption key to allow the printers in a certain group to decrypt the print job.

Certain examples described herein provide methods and devices that allow a group of printers to be defined, for example by an administrator, and a single 'group public key' generated for the group of printers, which can be used by a user to print to any printer in the group. A print job encrypted using the group public key may then be decrypted by any printer in the group using its own individual private key. Thus, definition and control of the printer groups may be placed in the hands of an administrator who then generates group public keys and distributed the group public keys to users to allow printing to the defined groups.

Broadcast encryption schemes are an area of cryptography which allow a broadcaster to encrypt a message for some subset S (of a total n users) who are listening to a broadcast channel. Any user in the subset S is able to decrypt the message, but users not in S cannot decrypt the message, even if they all collude. The subset S can be any arbitrary subset of the n users (according to the broadcaster's choice) and may be changed with each broadcast, if desired, after some computation on behalf of the broadcaster.

Broadcast encryption schemes may rely on symmetric or asymmetric cryptography and, in a symmetric setting, may be based on private keys, or 'license keys' sent to all users in the system by an administrator of the encryption scheme.

In a public key setting the administrator can generate a public/private key pair for each user, distribute each private key to the respective user in the system, and store the corresponding public keys. The administrator may then combine certain public keys to encrypt messages that can be broadcast to groups such that only selected members can decrypt the message. Examples of public-key based broadcast encryption constructions include Boneh, D., Gentry, C., & Waters, B. (2005, August). Collusion resistant broadcast encryption with short ciphertexts and private keys. In Annual International Cryptology Conference (pp. 258-275). Springer, Berlin, Heidelberg and Dodis, Y., & Fazio, N. (2002, November). Public key broadcast encryption for stateless receivers. In ACM Workshop on Digital Rights Management (pp. 61-80). Springer, Berlin, Heidelberg.

Some secure encrypted print schemes send a print job to a group of printers in a trivial way. For example, for a set of printers S, the key to decrypt the print job is independently encrypted under a public key of each printer in S and this set of ciphertexts is then broadcast. This uses a total of |S| public key encryptions.

However, to generate an encrypted print job using such approaches the user would need to know at the time the print job is encrypted about all the printers within the group to which the job may be transmitted and to obtain their public keys to encrypt the decryption key. Alternatively, the user might rely on further entity, such as a print server, to maintain a list of appropriate printer groups and a public key for each printer in the groups. The server could then encrypt a decryption key for all the printers in a target group. However, in the case that the user does not trust the print server it may be difficult to maintain confidentiality of the print job sent to the print server.

Described examples provide methods and apparatus to facilitate encryption of a print job for a group of printers under a single group public key based on an asymmetric broadcast encryption scheme. The examples of the use of an asymmetric broadcast encryption scheme disclosed herein are not restricted to any specific broadcast encryption scheme. The skilled person will be aware of a wide range of asymmetric broadcast encryption schemes that might be effectively used to implement the examples disclosed herein.

Figure 1A:
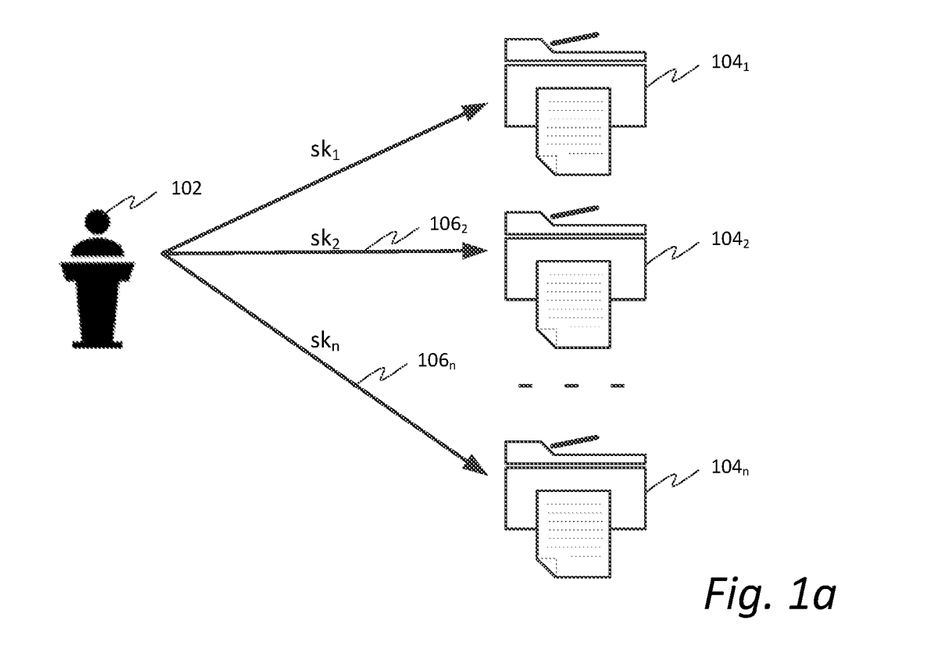
FIGS. 1a-c illustrates setup of a group printing environment according to an example of the disclosure.
Figure 1B:
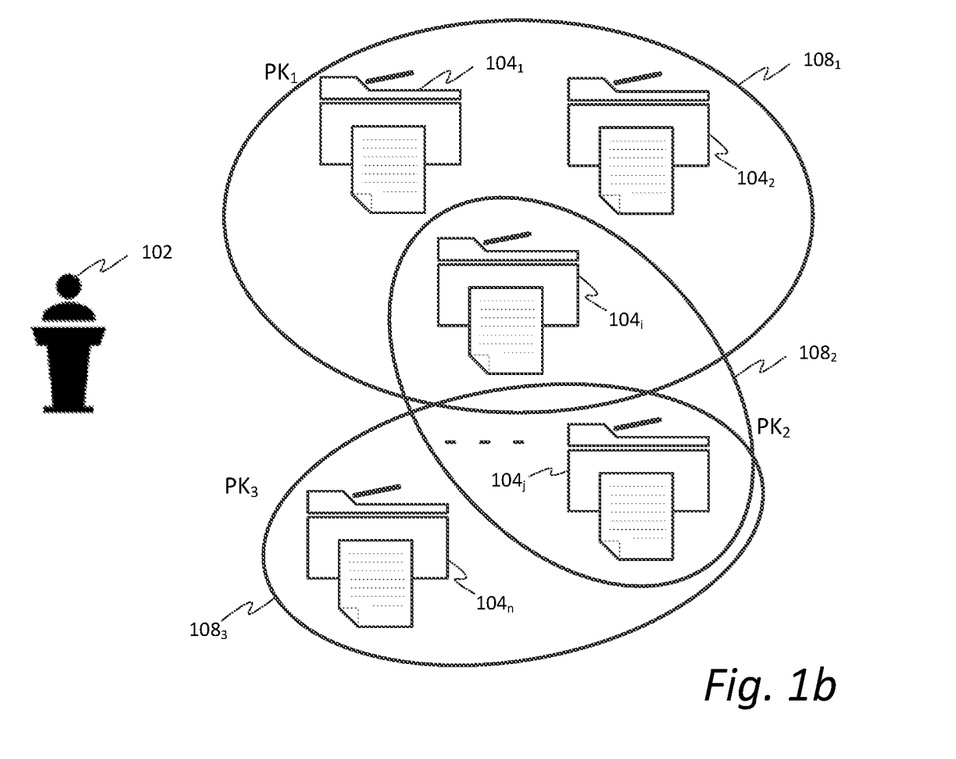
Figure 1C:
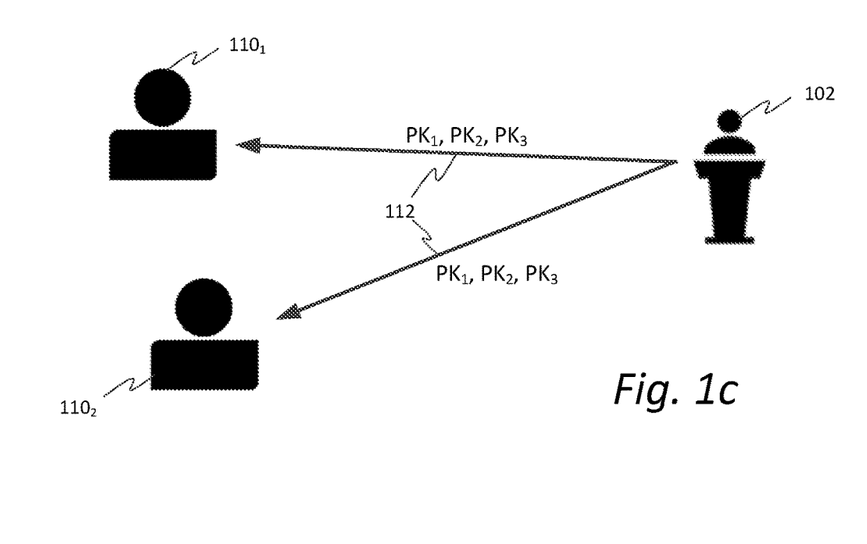

FIGS. 1a-c illustrate setup of the group printing environment by an administrator according to examples of the present disclosure. An organization may provide multiple printing devices that may be printed to by a user. For example, as illustrated in FIG. 1a, there may be n possible printers 104 that could be printed to. To initially setup secure group printing, an administrator 102 generates public/private key pairs for each of the n possible printers and securely provisions each printer with its respective private key 106. The public keys are then stored by the administrator.

The administrator 102 then defines one or more subsets of the possible printers 104 as groups 108 of printers 104, as illustrated in FIG. 1b. The administrator 102 is able to specify any number of possible groups 108 consisting of any number of the printers 104, and any one printer may be contained in multiple groups (i.e. the groups need not be disjoint). For example, in the arrangement shown in FIG. 1b, three groups $108_1$, $108_2$, $108_3$ have been defined, with printer $104_i$ assigned to groups $108_1$ and $108_2$ and printer $104_j$ assigned to groups $108_2$ and $108_3$.

For each group, the administrator 102 then uses the stored public keys corresponding to each printer 104 in that group 108 to generate a "group public key", denoted $PK_j$, for that set of printers. Thus, a first group public key $PK_1$ is generated first group $108_1$ based on the stored public keys for printers $104_1$, $104_2$, and $104_i$.

Once the group public keys have been generated, they are distributed to users 110 in the system. This may be achieved by the administrator 102 sending the keys 112 directly to the users 110, as shown in FIG. 1c, by the administrator providing the group public keys to the printers 104 which make the keys available to the users 110, or any other method.

Once the users 110 have obtained the group public keys, they are able to use these keys to encrypt a document such that it can only be decrypted by a printer belonging to the corresponding group. Thus, a user that wishes to securely print a print job to a specified group would select the group of printers they want to print to and then encrypt the print job using the group public key for that group. Any printer in the selected group is then able to retrieve and decrypt the print job using the secret key 106 initially provisioned to the printer 104 by the administrator 102. However, printers 104 not defined as a member of the selected group 108 will be unable to decrypt the print job, even if they all collude.

Figure 2A:
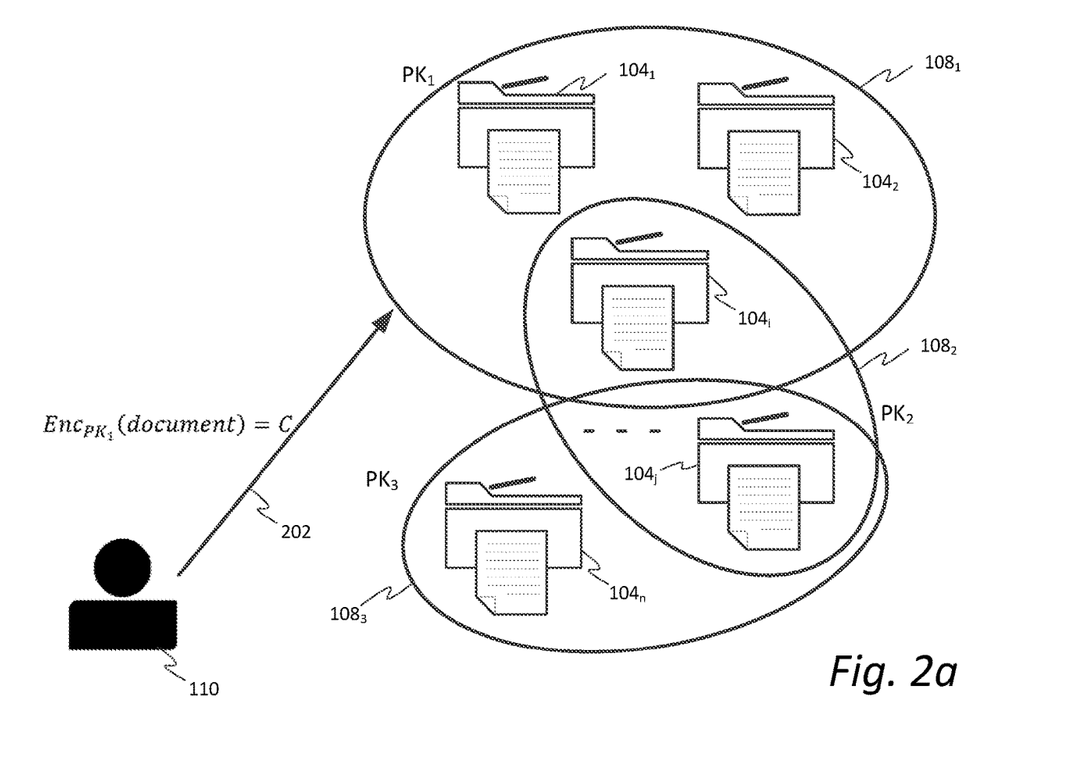
FIGS. 2a and 2b illustrates a user transmitting a print job to a print group according to an example of the disclosure.

FIG. 2a illustrates the process of a user 110 transmitting a print job to a group 109 of printers 104 according to an example of the disclosure. In the example shown in FIG. 2a, the user 110 selects a first group $108_1$ comprising printers $104_1$, $104_2$ and $104_i$ to print a document. Using the group public key $PK_1$ for first group $108_1$, the user encrypts the document to generate cyphertext 'C' 202 and transmits that ciphertext over the network.

In some examples, the ciphertext may be broadcast to all printing devices on the network, or may be transmitted to a subset of printing devices such as the devices of the first group $108_1$. As only the printers 104 of the selected group are able to decrypt the message, any other printer 104 receiving the encrypted print job will be unable to determine the contents of the print job, maintaining confidentiality of the job.

Figure 2B:
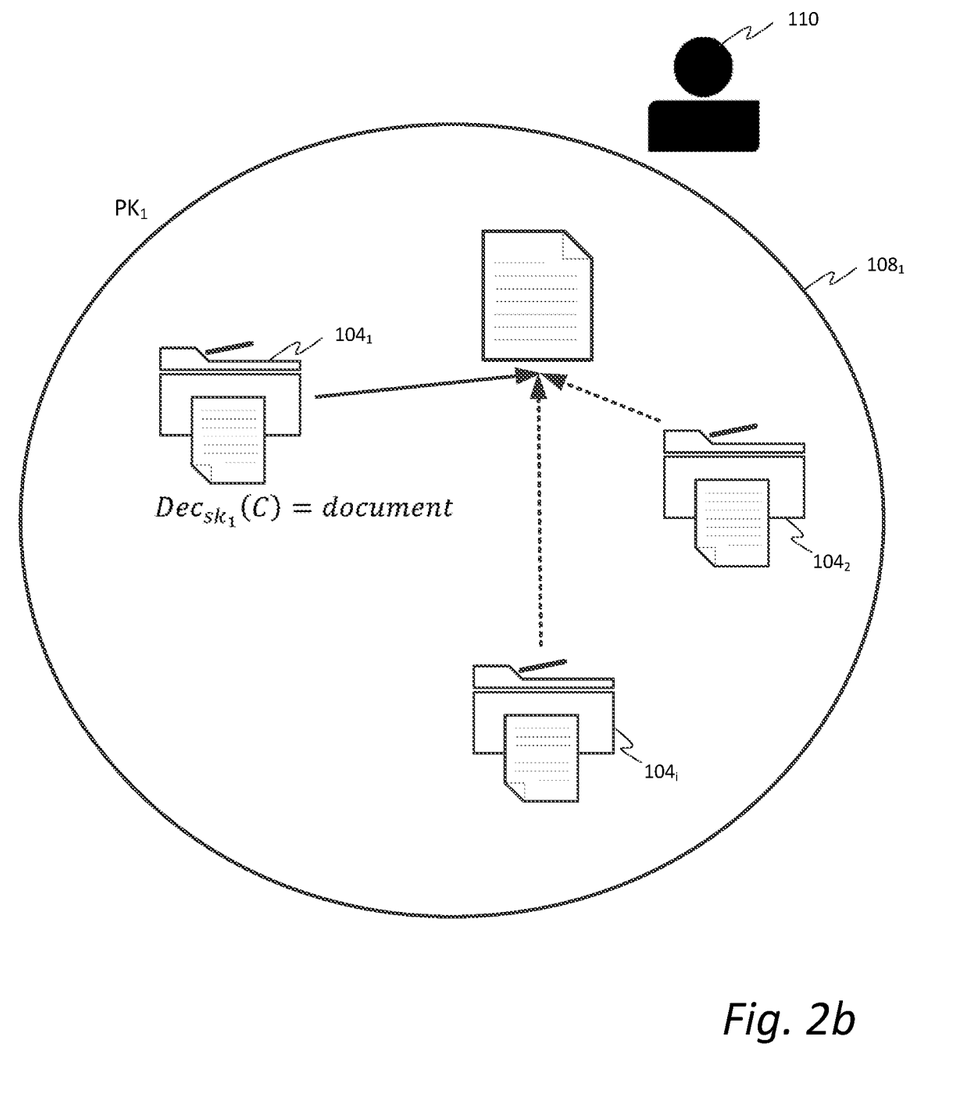

Once the ciphertext 202 has been received by the printers 104 of the selected group 108, the user may select a particular printer, e.g. a first printer $104_1$, of the group to provide a printed output of the print job. As shown in FIG. 2b, the first printer $104_1$ decrypts the ciphertext 202 using its provisioned secret key $sk_1$ to obtain the original document and is then able to print the user's document.

Figure 3:
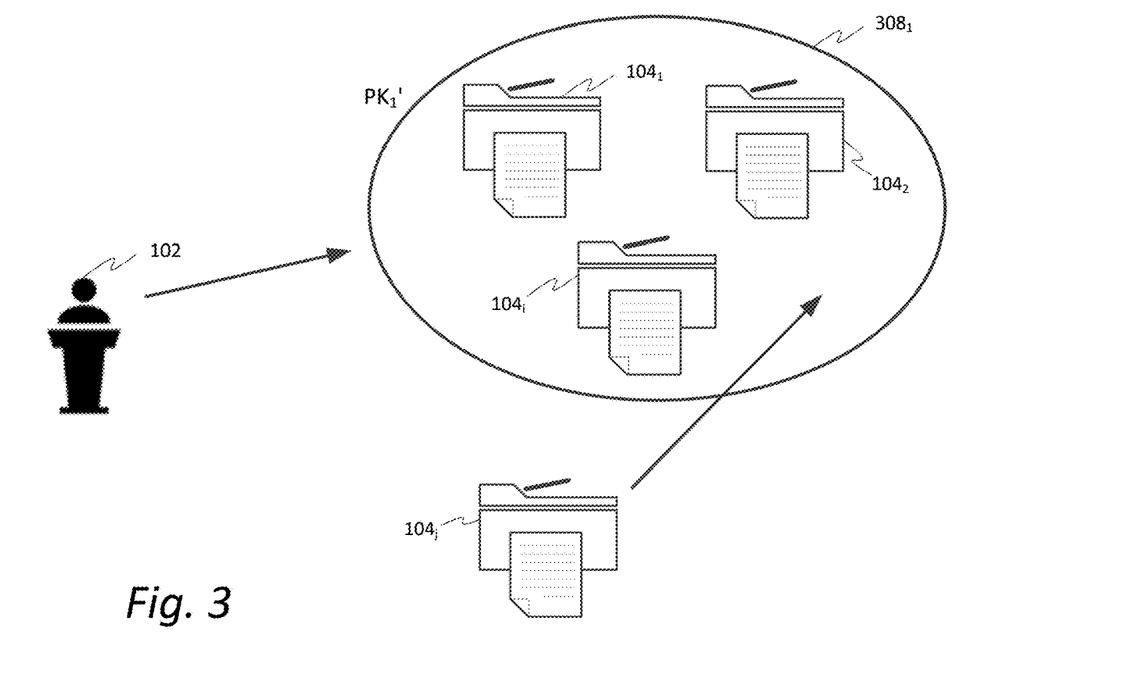
FIG. 3 illustrates addition of a printer to a print group according to an example of the disclosure.

From time to time, the administrator may wish to modify the assignment of printers 104 to the different groups 108. FIG. 3 illustrates a scenario in which an administrator 102 wishes to add a further printer $104_j$ already present on the network to the first group $108_1$ to which it wasn't previously assigned. The administrator 102 generates a new group public key $PK_1'$ for the first group based on the stored public keys for the current members of the first group $108_1$ and also on the stored public key for further printer $104_j$. The administrator then distributes the updated group public key, $PK_1'$, to the users 110.

Figure 4:
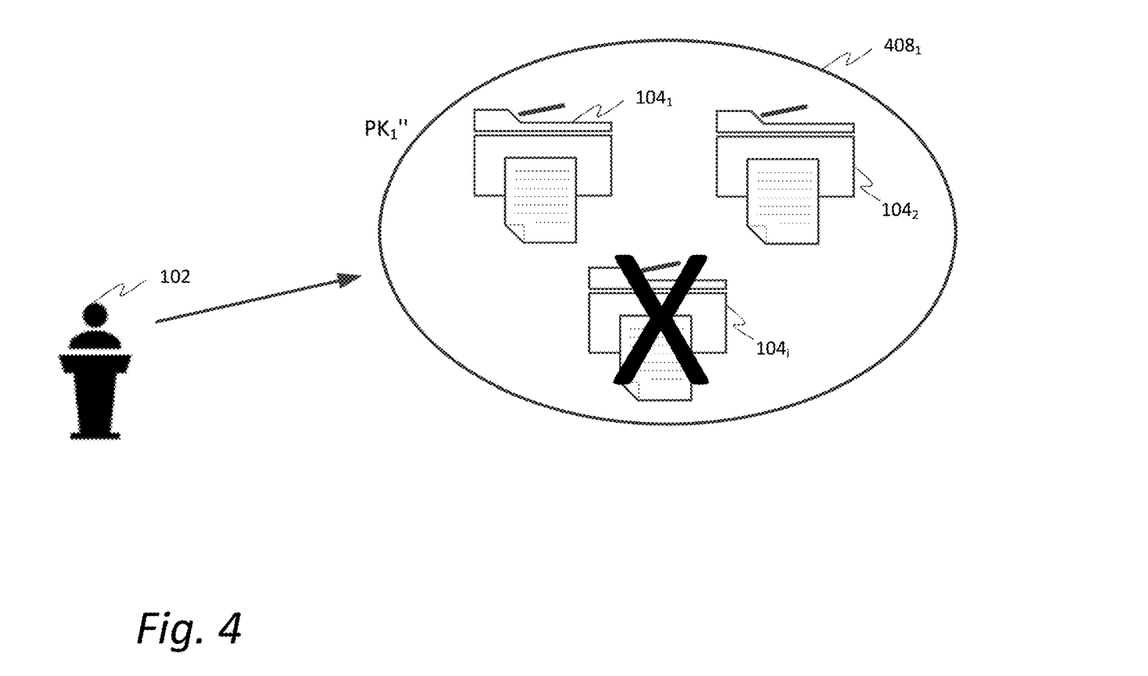
FIG. 4 illustrated removal of a printer from a print group according to an example of the disclosure.

Similarly, if the administrator 102 wishes to remove a printer from a group, such as removing printer $104_i$ from first group $108_1$ as illustrated in FIG. 4, the administrator generates a new group public key, $PK_1''$, based on the public keys for the remaining members of the group $104_1$ and $104_2$. The updated group public key, $PK_1''$, is then distributed to users 110.

As each printer has a unique private key that is used to decrypt encrypted print jobs, individual printers that have been removed from a group can no longer decrypt print jobs encrypted under an updated group public key. This may be particularly advantageous if a particular device's private key becomes compromised, as once the group public key is updated no further use can be made of the compromised key.

Figure 5:
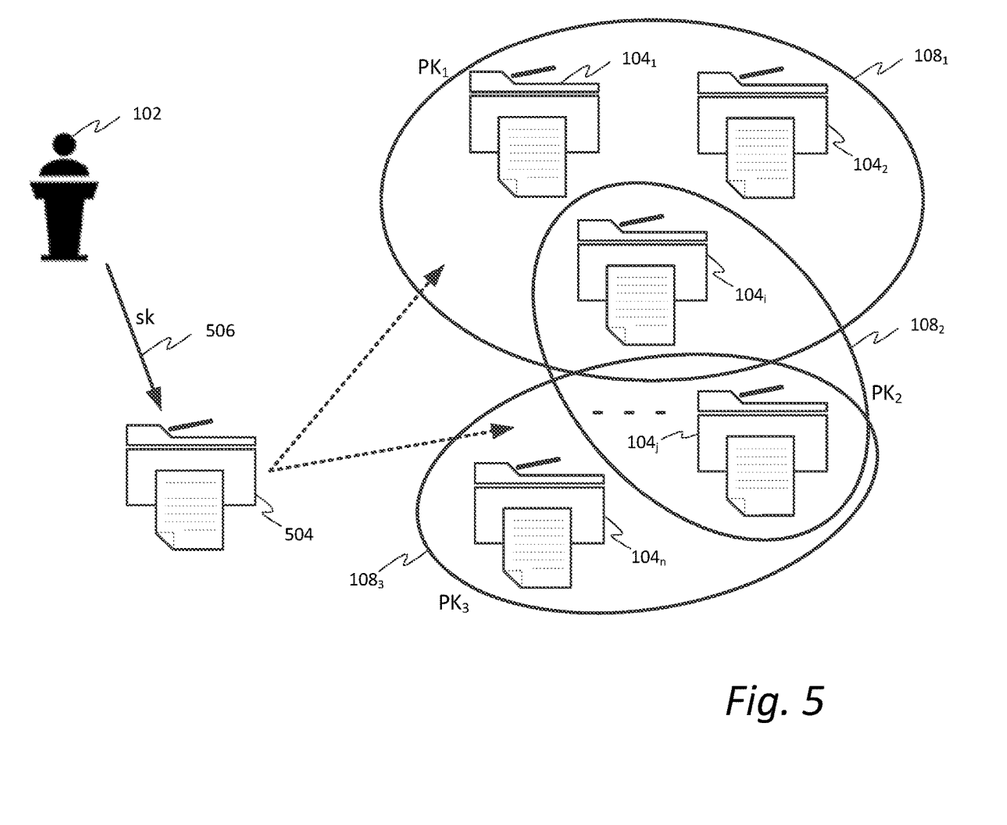
FIG. 5 shows addition of a new printer to the system and assignment to print groups according to an example of the disclosure.

FIG. 5 illustrates an example in which the administrator 102 wishes to add a new printer 604 to the system. The administrator 102 first provisions the new printer 604 with a secret key 604. Once the secret key has been provisioned, the administrator is able to add the new printer 604 to any selected group 108 using the procedure described above with respect to FIG. 4.

The skilled person will recognize that there are several public key broadcast encryption scheme constructions that could be implemented to achieve the described system. The exact construction of the above recited public and private keys depends on the chosen broadcast encryption scheme. Two possible example constructions that could be used are presented in Boneh, D., Gentry, C., & Waters, B. (2005, August). Collusion resistant broadcast encryption with short ciphertexts and private keys. In Annual International Cryptology Conference (pp. 258-275). Springer, Berlin, Heidelberg and Dodis, Y., & Fazio, N. (2002, November). Public key broadcast encryption for stateless receivers. In ACM Workshop on Digital Rights Management (pp. 61-80). Springer, Berlin, Heidelberg.

Using a broadcast encryption scheme in the described manner allows a company administrator 102 to define groups consisting of a subset of available printers 104 to enable users 110 to easily and securely print to the defined groups of trusted printers. Previously, to print to multiple printers, it would be for the user to individually identify selected printers and encrypt a decryption key, to be used to decrypt the print job, independently under the public key of each selected printer.

However, this is not possible where the user does not know which device they are printing to, which may be the case in systems implementing print queues, pull print, roaming, etc. Based on the disclosed techniques, a user operating in these scenarios is able to print to a collection of printers defined by an administrator, simplifying the process for the user, i.e. the administrator is able to pre-define groups of printers for the user to use rather than the user having to find the information for each printer they would like to include in their group and constructing the group themselves.

The user of a broadcast encryption scheme may result in a smaller ciphertext than the naïve solution. That is, to send a decryption key to a subset of printers S in the naïve solution, |S| public key ciphertexts, along with a description of who has been included in the set is included in the header. In contrast, using broadcast encryption, one broadcast encryption ciphertext is sent, which is smaller than with the naïve solution.

Furthermore, the described examples provide an administrator with the flexibility to easily introduce new printers to the system, and to add or remove printers from the groups, with minimal disruption to the users. For example, the administrator is able to define a group of printers in one location and make a corresponding group public key available. Adding and removing printers from this area may then be achieved by updating just the one group public key and distributing the updated key to the users. This contrasts with having to indicate to the user that certain printers are being removed and added on an individual basis.

Figure 6:
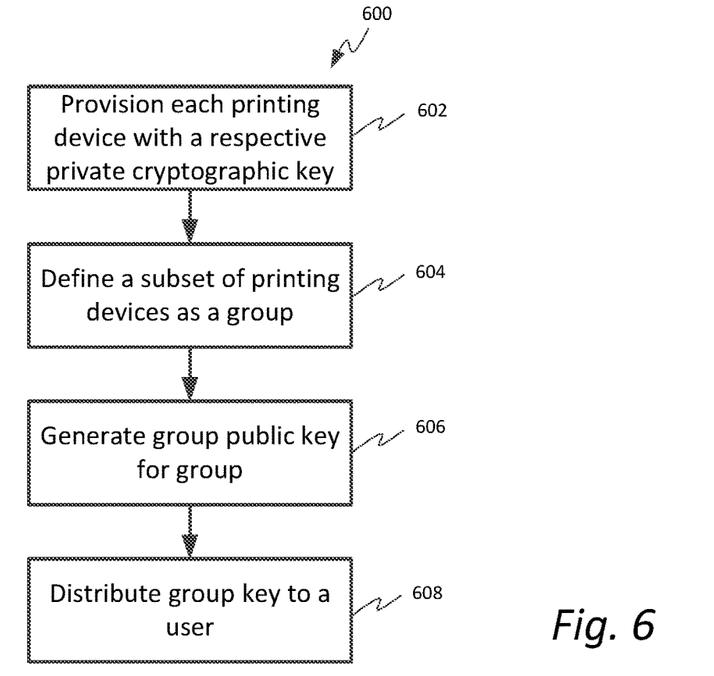
FIG. 6 shows a method according to an example of the disclosure.

FIG. 6 shows a method 600 of implementing secure group printing to a group of printing devices comprising a subset of a plurality of printing devices coupled to a network. According to the method 600 of FIG. 6, each printing device is securely provisioned 602 with a private cryptographic key according to an asymmetric cryptographic scheme. For example, a public/private key pair may be generated for each printing device and the private cryptographic key provisioned to the device by an administrator when enrolling the device into a network. The public keys corresponding to each device may be stored locally by an administrator.

Subsequently, the administrator may wish to define 604 a subset of the plurality of printing devices as a first print group by selecting one or more printing devices to be a member of the print group. Based on the public cryptographic keys corresponding to the printers selected to form the first print group, a first group public key is generated 606. Generation of the group public keys may be according to any of a number of asymmetric broadcast encryption schemes such as the examples previously outlined. As discussed above, the group public key can be used to encrypt a document that can then be decrypted using the private key of any of the selected printing devices.

The generated first group public key is then distributed 608 to at least one user in the system to allow the user to encrypt a document for printing on any printer that is a member of the first print group.

Figure 7:
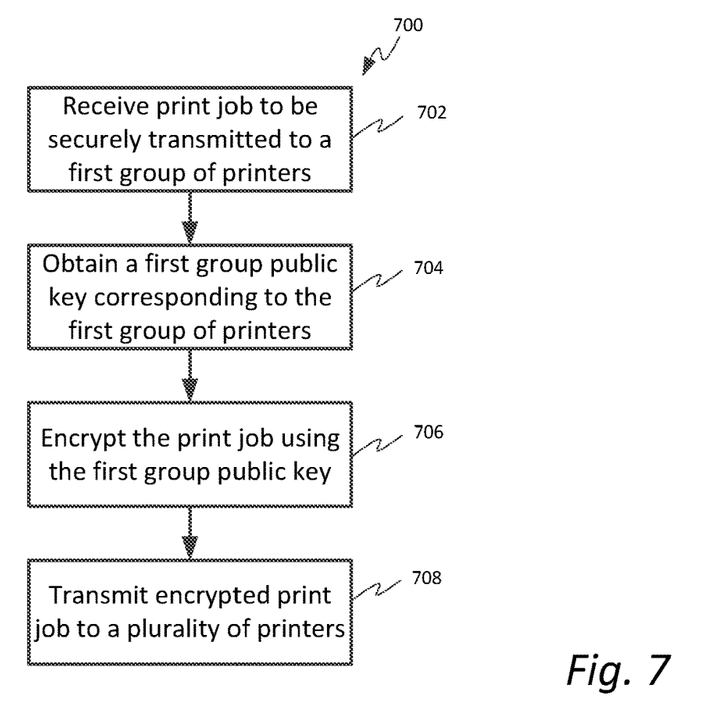
FIG. 7 shows a further method according to an example of the disclosure.

FIG. 7 illustrates a method 700 performed by a user station to print to securely any one of a number of printers in a defined print group. According to the method 700 of FIG. 7, a print job is received 702, for example as a request from a user to print a document via a GUI, that is to be securely transmitted to a first group of printers. A first group public key, corresponding to the first group is obtained 704. Using the first group public key, the print job is encrypted 706 at the user station. The encrypted job is then transmitted 708 to one or more printers.

In some examples, the first group public key may be obtained in advance and stored locally at a user station for future use, or may be obtained as upon request from a server or from a printer. According to an example, the encrypted print job may be transmitted to the subset of printers in the first print group, to a plurality of printers within a certain geographical area including at least one printer of the first print group, broadcast to all available printing devices on the network, etc.

Figure 8:
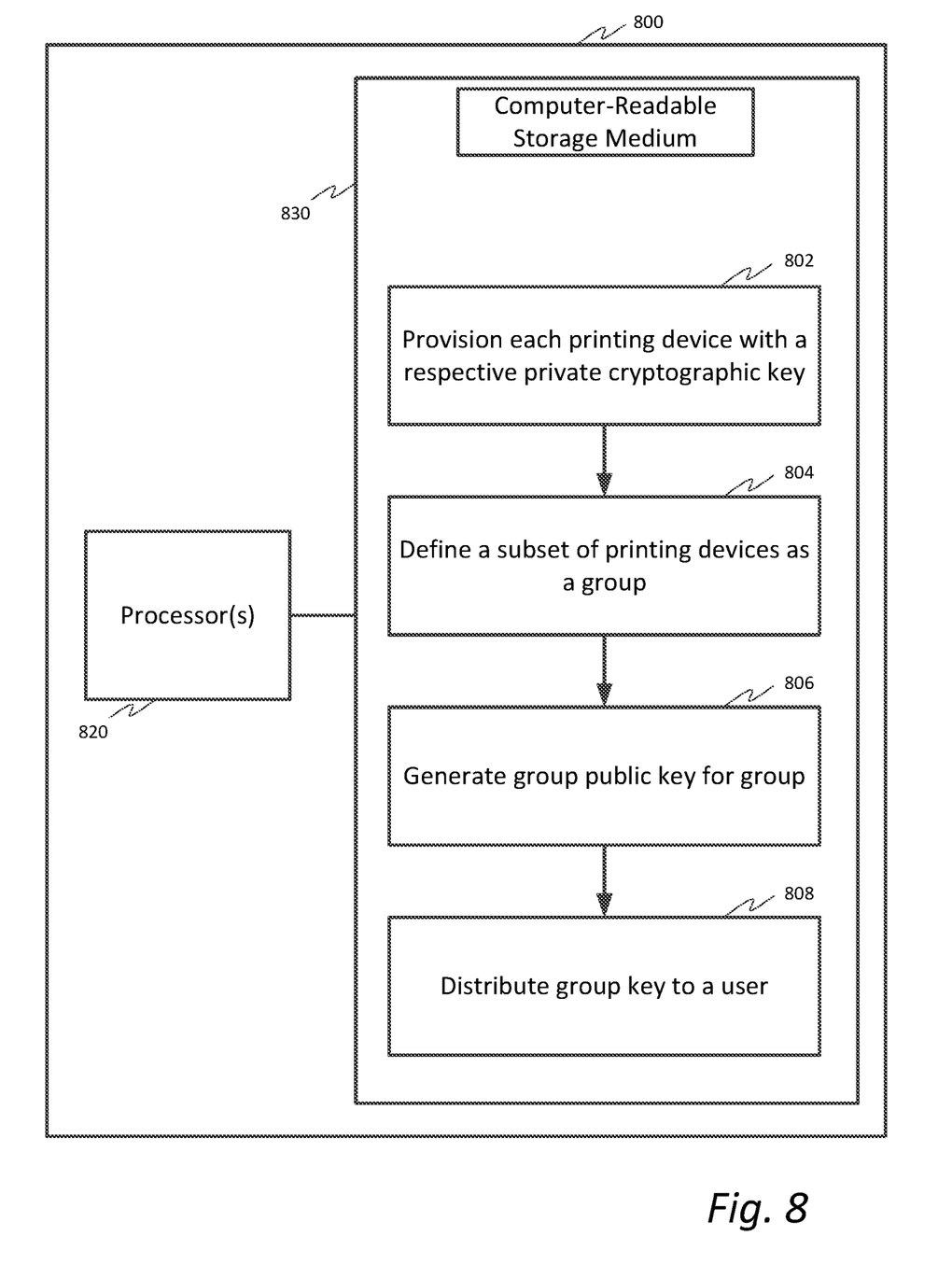
FIG. 8 is a schematic block diagram of a computer system according to an example of the disclosure.

Certain methods and systems as described herein may be implemented by one or more processors that processes program code that is retrieved from a non-transitory storage medium. FIG. 8 shows an example 800 of a device comprising a computer-readable storage medium 830 coupled to at least one processor 820. The computer-readable media 830 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 8, the computer-readable storage medium comprises program code to perform a method corresponding to the example shown in FIG. 6, that is: provision 802 each printing device with a respective private cryptographic key; define 804 a subset of printing devices a first print group; generate 806 a first group public key for the first print group; and distribute 808 the first group public key to at least one user.

In other examples, computer-readable storage medium 830 may comprise program code to perform a method 700 as illustrated in FIG. 7.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A method comprising:
provisioning each printing device of a plurality of printing devices with a private cryptographic key;
defining a first group of printing devices comprising a first subset of the plurality of printing devices;
generating a first group public key for the defined first group of printing devices, the first group public key generated based on public cryptographic keys corresponding to the private cryptographic keys provisioned to the first subset of the plurality of printing devices; and
providing the first group public key to a user.

2. The method of claim 1, further comprising:
defining a second group of printing devices comprising a second subset of the plurality of printing devices, the second subset of the plurality of printing devices including at least one printing device not included in the first subset of the plurality of printing devices;
generating a second group public key for the defined second group of printing devices, the second group public key generated based on public cryptographic keys corresponding to the respective private cryptographic keys provisioned to the second subset of the plurality of printing devices; and providing the second group public key to the user.

3. The method of claim 1, wherein generating the first group public key comprises generating a first group public key using a broadcast encryption scheme.

4. The method of claim 1, further comprising:
identifying a further printing device of the plurality of printing devices to be added to the first group of printing devices;
generating a new first group public key based on the public cryptographic keys corresponding to the respective private cryptographic keys provisioned to the first subset of the plurality of printing devices and to the further printing device; and
providing the new first group public key to the user.

5. The method of claim 1, further comprising:
identifying one printing device of the first subset of the plurality of printing devices to be removed from the first group of printing devices;
generating a new first group public key based on the public cryptographic keys corresponding to the respective private cryptographic keys provisioned to the first subset of the plurality of printing devices other than the identified one printing device; and
providing the new first group public key to the user.

6. The method of claim 1, further comprising:
determining that a new printing device is to be added to the plurality of printing devices;
provisioning the new printing device a private cryptographic key associated with the new printing device;
determining that the new printing device is to be added to the first group of printing devices;
in response to determining that the new printing device is to be added to the first group of printing devices:
generating a new first group public key based on the public cryptographic keys corresponding to the respective private cryptographic keys provisioned to the first subset of the plurality of printing devices and to the new printing device; and
providing the new first group public key to the user.

7. The method of claim 1, further comprising:
determining that a print job is to be securely transmitted to the printing devices of the first group of printing devices;
encrypting the print job using the first group public key; and
transmitting the encrypted print job to at least one printing device of the first group of printing devices.

8. The method of claim 7, further comprising:
receiving the encrypted print job at a printing device of the first subset of printing devices:
decrypting the print job using the private cryptographic key provisioned to the printing device; and
printing, by the printing device, the print job.

9. The method of claim 1, further comprising storing public cryptographic keys corresponding to the respective private cryptographic keys provisioned to the plurality of printing devices at an administration server coupled to a network; and
wherein said generating the first group public key and providing the first group public key to the user is performed by the administration server.

10. An administration server comprising:
a network interface;
a provisioning module coupled to the network interface and to provision each of a plurality of printing devices with a respective private cryptographic key;
a key store memory to store public cryptographic keys corresponding to the respective private cryptographic keys provisioned to the plurality of printing devices;
a cryptographic key module to generate a first group public cryptographic key associated with a first subset of printing devices based on the stored public cryptographic keys corresponding to the respective private cryptographic keys provisioned to the first subset of printing devices; and
a key distribution module coupled to the network interface and to cause the network interface to transmit the first group public key to a user.

11. The administration server of claim 10, wherein the cryptographic key module is further to generate a second group public key for a second subset of printing devices, the second subset of the plurality of printing devices including at least one printing device not included in the first subset of the plurality of printing devices, wherein the second group public key is generated based on the stored public cryptographic keys corresponding to the respective private cryptographic keys provisioned to the second subset of the plurality of printing devices; and
wherein the key distribution module is further to cause the network interface to transmit the second group public key to the user.

12. The administration server of claim 10, wherein the cryptographic key module is further to generate the first group public key according to a broadcast encryption scheme.

13. The administration server of claim 10, further comprising a control module to receive an indication that a new printing device is to be added to the plurality of printing devices;
wherein in response to receiving the indication that the new printing device is to be added, the control module further to:
cause the provisioning module to provision the new printing device a private cryptographic key associated with the new printing device;
store a public cryptographic key corresponding to the private cryptographic key provisioned to the new printing device in the key store;
obtain an indication that the new printing device is to be added to the first group of printing devices;
cause the cryptographic key module to generate a new first group public key based on the public cryptographic keys corresponding to the respective private cryptographic keys provisioned to the first subset of the plurality of printing devices and to the new printing device; and
the key distribution module further to cause the network interface to transmit the new first group public key to the user.

14. The administration server of claim 10, further comprising a control module to:
receive an indication that one of the printing devices of the plurality of printing devices is to be added to or removed from the first group printing devices;
determine a new subset of printing devices for the first group of printing devices based on the received indication; and
cause the cryptographic key module to generate a new first group public cryptographic key associated with the first group of printing devices based on the stored public cryptographic keys corresponding to the respective private cryptographic keys provisioned to the new subset of printing devices; and wherein the key distribution module is further to cause the network interface to transmit the new first group public key to the user.

15. A computing device for delivering a print job to a first group of printing devices comprising a subset of a plurality of printing devices coupled to a network, the computing device comprising:

a network interface;

a user interface to receive an indication from a user that the print job is to be securely transmitted to the subset of printing devices of the first group of printing devices;

an encryption module coupled to the network interface and to:

obtain a first group public key via the network interface, wherein the first group public key is generated based on public cryptographic keys corresponding to private cryptographic keys provisioned to the subset of printing devices;

encrypt the print job using the first group public key; and cause the network interface to transmit the encrypted print job to at least one printing device coupled to the network.

* * * * *